(12) United States Patent
Snyder et al.

(10) Patent No.: US 6,501,581 B1
(45) Date of Patent: Dec. 31, 2002

(54) ADAPTOR AND METHOD FOR USE WITH A LIGHT-COMMUNICATION DEVICE

(75) Inventors: Thomas D. Snyder, Cary, NC (US); Henry Holcomb, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/186,915

(22) Filed: Nov. 6, 1998

(51) Int. Cl.[7] .............................................. H04B 10/00
(52) U.S. Cl. ...................................... 359/163; 359/142
(58) Field of Search ................................ 359/142, 143, 359/152, 154, 159, 163, 172, 173

(56) References Cited

U.S. PATENT DOCUMENTS

| | | | | |
|---|---|---|---|---|
| 4,070,572 A | * | 1/1978 | Summerhayes | 250/199 |
| 4,317,232 A | * | 2/1982 | Pickett et al. | 455/606 |
| 4,502,937 A | * | 3/1985 | Yagi | 204/406 |
| 5,105,293 A | * | 4/1992 | Bortolini | 359/154 |
| 5,566,022 A | * | 10/1996 | Segev | 359/172 |
| 5,602,668 A | * | 2/1997 | Kuchta | 359/173 |
| 5,736,931 A | * | 4/1998 | Sato et al. | 340/525.25 |
| 5,822,101 A | * | 10/1998 | Deguchi | 359/172 |
| 5,861,968 A | * | 1/1999 | Kerklaan et al. | 359/152 |
| 5,864,708 A | * | 1/1999 | Croft et al. | 395/821 |
| 6,038,048 A | * | 3/2000 | Harris et al. | 359/159 |

* cited by examiner

Primary Examiner—Leslie Pascal
Assistant Examiner—Dalzid Singh
(74) Attorney, Agent, or Firm—Coats & Bennett, P.L.L.C.

(57) ABSTRACT

An adaptor for use with a light-communication device including a frame and a light guide on the frame. The light guide has a first light port assembly to receive a light signal from a light-communication device, a second light port assembly to output a light signal received by the first light port assembly, and a light transmission element for directing a light signal in a predetermined path between the first and second light port assemblies. The adaptor may be used in a system with two or more light-communication devices. Also provided is a method for communicating light signals between light-communication devices.

19 Claims, 9 Drawing Sheets

ADAPTOR AND METHOD FOR USE WITH A LIGHT-COMMUNICATION DEVICE

FIELD OF THE INVENTION

The present invention is directed to an adaptor and a method for use with a device communicating using light signals, and in particular an adaptor and a method for altering the path of propagation of a light signal transmitted by a device communicating using light signals.

BACKGROUND OF THE INVENTION

The definition of the "office" has changed dramatically over the last two decades. The office was once thought of as room in a building that a person went to communicate with customers, vendors, co-workers etc. and to prepare reports, proposals, correspondence, etc. This is no longer the case. At least two major advances in technology have helped redefine the way in which the public views the "modern" office.

One of the advances in technology that has been instrumental in changing the traditional definition of the office is the advent of "wireless" telephone technology. "Wireless" telephones allow the businessperson-on-the-go to communicate with his or her customers, vendors, etc. from literally almost anywhere on the planet. "Wireless" telephone technology has been instrumental in changing the definition of the office from a place that you go to, to any place that you go.

The other technology that has helped shape the definition of the modern office is the laptop computer. It is no longer necessary to go into the "office", because the laptop computer allows all of the necessary facts and figures to be condensed down into an easily manageable, highly portable format. As was the case with the wireless phone, the portable computer allows the business person to take his or her office with him or her on the road, eliminating the need to remain tied down to a fixed location.

It seems almost a logical and foregone conclusion to marry these two technologies together to produce a highly portable and adaptable office suite. However, computer technology has principally been a "wired" technology. That is, for a peripheral to be associated with a portable laptop computer, it has been typically necessary to install a cable running from the peripheral to the computer. Thus, it has been necessary to use a cable to connect the cellular phone to the portable computer.

To achieve the desired goal of making the modern office fully "wireless", it has been proposed to use infrared signals to transmit data between the cellular phone and the portable computer. However, there has been little to no standardization of the position of the infrared transmitter/receivers in cellular phones and the position of the infrared transmitter/receivers in portable computers. As a consequence, the infrared transmitter/receiver in the cellular phone and in the portable computer may be assembled in such a way that the phone may have to have its display reversed to the user to establish a communication link between the phone and the computer. By having the display reversed to the user, it may be nearly impossible for the user to be aware of status messages which may be displayed on the display of the phone.

One suggestion to overcome this problem is to increase the power of the signals transmitted back and forth between the phone and the laptop. By doing so, it is thought that even after reflecting off of obstacles in the path of propagation of the signal, the signal may be sufficiently strong so as to be readable by the receiving device. This might allow the face of the phone with the display thereon to be at least inclined at an angle to the user during a communication link between the phone and the computer.

However, this solution is hardly suitable. For one thing, even with the increased power, if the transmitter/receiver of the first device is oriented relative to the transmitter/receiver of the second device such that the transmitter/receivers do not face each other, the chances that a viable link can be established will be greatly diminished. Furthermore, given that battery consumption has always been a concern in the wireless telephone industry, and that the trend has been to minimize battery consumption to decrease battery size, a system that increases battery consumption is generally considered to be undesirable.

SUMMARY OF THE INVENTION

According to an aspect of the present invention, an adaptor for use with a light-communication device includes a frame and a light guide on the frame. The light guide has a first light port assembly to receive a light signal from a light-communication device, a second light port assembly to output a light signal received by the first light port assembly, and a light transmission element for directing a light signal in a predetermined path between the first and second light port assemblies.

The light transmission element may be a light transmission element with a selectively adjustable path between the first and second light port assemblies.

Additionally, the frame may include a first housing and a second housing guidingly supported on the first housing to be moveable relative to the first housing. The first light port assembly may be housed in the second housing, and the second housing may have a seat for receiving a light-communication device therein disposed proximately to the first light port assembly. The second light port assembly may be housed in the first housing.

In this adaptor, the first housing may have a first housing interface surface, and the second housing may have a second housing interface surface proximate to the first housing interface surface. The light transmission element may have a first light transmission element segment housed in the first housing, coupled to the first light port assembly, and having a first light transmission element interface surface disposed at the first housing interface surface. The light transmission element may also have a second light transmission element segment housed in the second housing, coupled to the second light port assembly and having a second light transmission element interface surface disposed at the second housing interface surface parallel to and proximate to the first light transmission element interface surface.

Further, the first and second housings may be moveable relative to each other about a housing axis, and the first and second light transmission element interface surfaces each may be substantially circular, have a center axis, and have the center axis collinear with the housing axis.

The first light port assembly may be a unidirectional optical device and the second light port assembly may be a multidirectional optical device.

Further, an amplifier assembly may be coupled to the light transmission element between the first and second light port assemblies to increase the strength of the light signal directed between the first and second light port assemblies.

Also, the second light port assembly may include first and second optical devices, and the light transmission element may be a light transmission element for directing a light signal in a first predetermined path between the first light port assembly and the first optical device and a second predetermined path between the first light port assembly and the second optical device. In particular, the light transmission element may include a trunk segment, first and second leg segments, and a Y-connector coupled to the trunk segment and the first and second leg segments. The trunk segment is coupled to the first light port assembly, the first leg segment is coupled to the first optical device and the second leg segment is coupled to the second optical device. Moreover, the first and second leg segments may be optical path guides having different effective diameters.

In any of the above-mentioned adaptors, the first or second light port assembly may be a unidirectional optical device, for example, a flat lens or a mirror. The first or second light port assemblies may also be a multidirectional optical device, for example, a hemispherical lens or a conically-shaped mirror. The light transmission element may be a fiber optic cable.

According to another aspect of the present invention, a light-communication system may include first and second light-communication devices and an adaptor with a frame and a light guide on the frame. The light guide may include a first light port assembly to receive a light signal from one of the first and second light-communication devices, a second light port assembly to output a light signal received by the first light port assembly to the other of the first and second light-communication devices, and a light transmission element for directing a light signal in a predetermined path between the first and second light port assemblies.

According to a further aspect of the invention, a method is provided for communicating light signals between light-communication devices. The method includes the steps of providing a first light-communication device which transmits a light signal in a first path and at a first signal strength, providing a second light-communication device which is capable of receiving a light signal directed at the second light-communication device in a second path, and altering at least one of the path and signal strength of a light signal transmitted by the first light-communication device in the first path at the first signal strength to enhance communication between the first light-communication device and the second light-communication device.

Additionally, where the first and second paths are different with the first and second light-communication devices in a first relative orientation, the step of altering at least one of the path and signal strength may include altering the light signal from the first light-communication device in a predetermined manner from the first path into the second path with the first and second light-communication devices in the first relative orientation. Where the light signals directed along the first and second paths have different directions with the first and second light-communication devices in a first relative orientation, the step of altering at least one of the path and signal strength may include altering the light signal from the first light-communication device in a predetermined manner from the direction of the first path to the direction of the second path with the first and second light-communication devices in the first relative orientation. Further, an adaptor with a first light port assembly to receive the light signal from the first light-communication device and a second light port assembly coupled to the first light port assembly to receive light signals therefrom may also be provided. In this case, the step of altering at least one of the path and signal strength may include altering the second light port assembly from a first orientation relative to the first light port assembly to a second orientation relative to the first light port assembly.

Alternatively, where the first and second paths are different with the first and second light-communication devices in a first relative orientation, the step of altering at least one of the path and signal strength may include altering the light signal from the first light-communication device in a predetermined manner from along the first path to along the first and second paths with the first and second light-communication devices in the first relative orientation. Additionally, where light signals directed along the first and second paths have different directions with the first and second light-communication devices in a first relative orientation, the step of altering at least one of the path and signal strength may include altering the light signal from the first light-communication device in a predetermined manner from the direction of the first path to the direction of the first and second paths with the first and second light-communication devices in the first relative orientation. Moreover, the step of altering at least one of the path and signal strength may include increasing the signal strength of the light signal from the first signal strength to a second signal strength.

DETAILED DESCRIPTION OF THE PREFERRED EMBODIMENT

Figure 1:
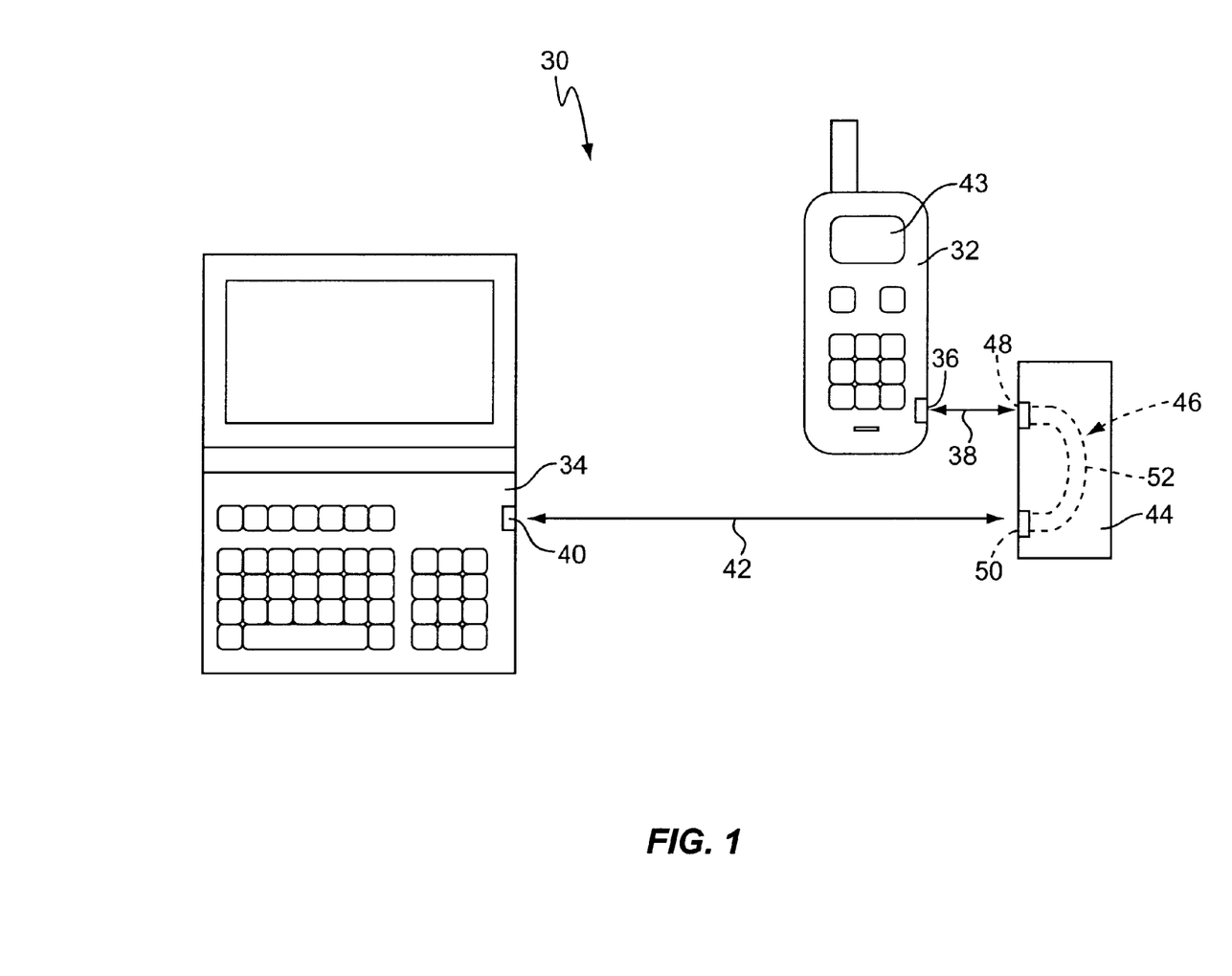
FIG. 1 is a schematic diagram of a system including first and second light-communication devices and an adaptor according to the invention used to couple the first light-communication device to the second light-communication device in a unidirectional fashion.
Figure 2:
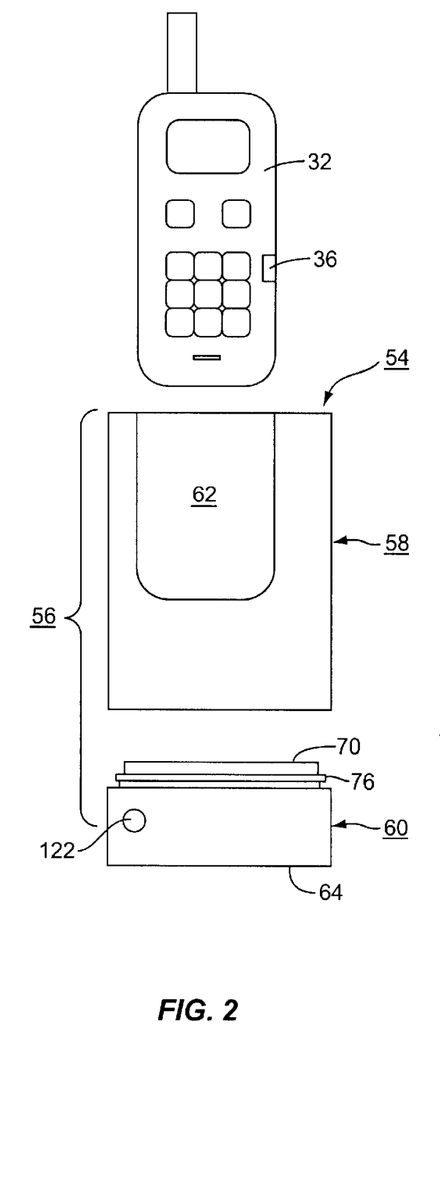
FIG. 2 is an exploded, frontal view of an embodiment of an adaptor according to the present invention having first and second housings movable relative to each other.

Referring first to FIG. 1, a light-communication system 30 is shown having a first light-communication device 32 and a second light-communication device 34. The first light-communication device 32 may be, for example, a cellular phone, while the second light-communication device 34 may be a laptop or portable computer. The first light-communication device 32 has a light port assembly 36 for the transmission and receipt of light signals in the form of light rays back and forth along a first axis of propagation 38. Similarly, the second light-communication device 34 has a light port assembly 40 for the transmission and receipt of light signals in the form of light rays back and forth along a second axis of propagation 42. As shown in FIG. 1, given the orientation of the first and second axes of propagation 38, 42, it would be difficult to establish a link between the first light-communication device 32 and the second light-communication device 34 with the devices in a desired relative orientation, as shown, because the light rays transmitted from the first light-communication device 32 are directed away from the device 34, the light rays from the device 34 directed towards the light port assembly 36 are obstructed by the device 32, and the axes of propagation 38, 40 are not aligned.

One way to solve the problem, as suggested above, would be to reverse the orientation of the first light-communication device 32 so that the light port assemblies 36, 40 are facing each other and reposition the device 32 so that the axes 38, 42 are aligned. An acceptable link might then be established between the devices 32, 34. However, as also discussed above, by reversing the orientation of the first light-communication device 32, a display 43 of the first light-communication device 32 may also be reversed to the user, making it difficult for the user to be aware of incoming messages shown on the display 43.

According to the invention, an adaptor 44 is provided as shown in FIG. 1. The adaptor 44 includes a light guide 46 having a first light port assembly 48 and a second light port assembly 50, and a light transmission element 52 connecting the first light port assembly 48 with the second light port assembly 50 to direct light signals therebetween along a predetermined path. In operation, the adaptor 44 passes (receives from and outputs to) light signals with the first light-communication device 32 along the first axis 38 via the first light port assembly 48. Similarly, the second light port assembly 50 passes light signals along the second axis of propagation 42 with the second light-communication device 34. Through the adaptor 44, the axes of propagation 38, 42 are aligned and the direction of light rays leaving the light ports 36, 40 reversed so that the first light-communication device 32 can communicate with the second light-communication device 34 without having to change the orientation and position of the first light-communication device 32 with respect to the second light-communication device 34.

While the system 30 shown uses infrared light signals to establish a communication link, the present invention is not so limited. Indeed, the adaptor 44 according to the present invention can be used with any system using light signals capable of transmitting data and other information between the first and second light-communication devices. 32, 34. One of ordinary skill in the art would recognize that the material for the light guide 46 would need to be selected according to the wavelength of light being used to transmit the data and other information between the first light-communication device 32 and the second light-communication device 34.

Figure 3:
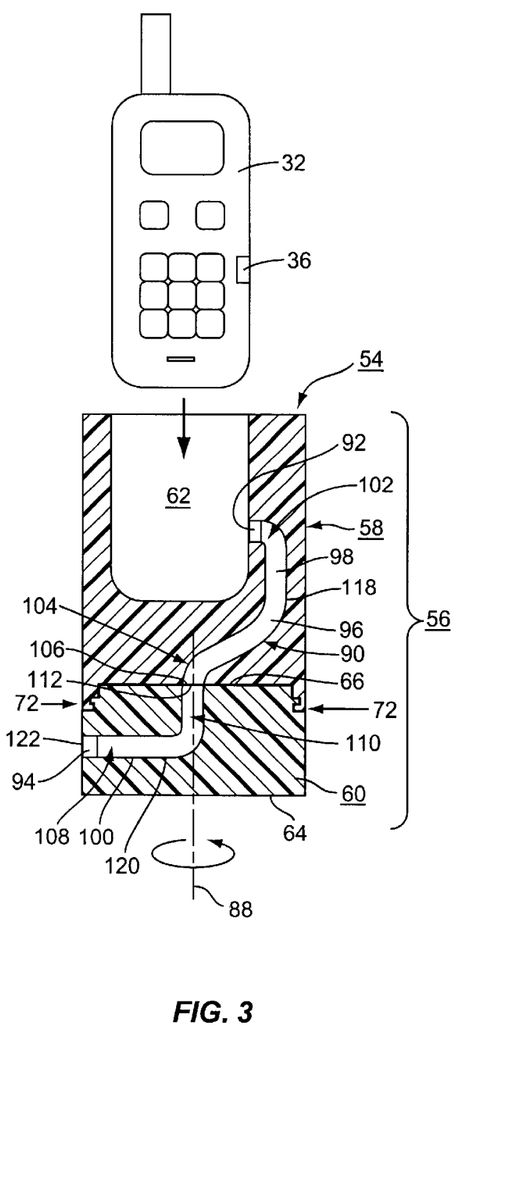
FIG. 3 is a cross-sectional view of the adaptor shown in FIG. 2, as assembled.
Figure 4:
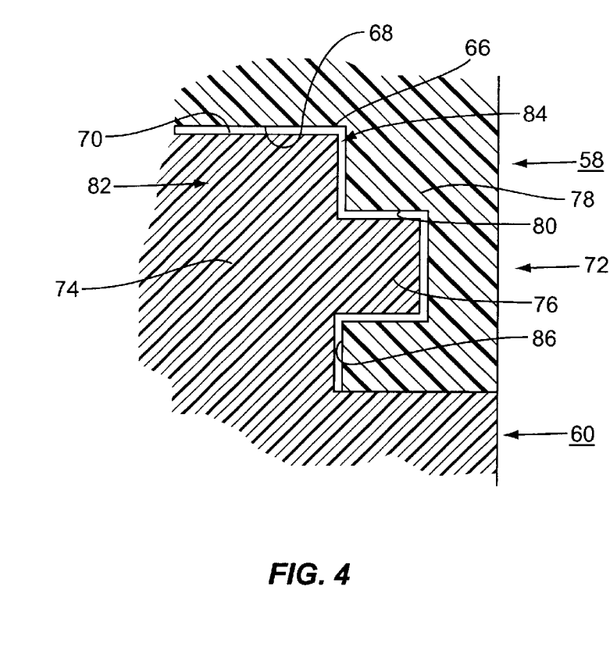
FIG. 4 is an enlarged, cross-sectional view of the mechanism for movably attaching the first housing to the second housing of the adaptor shown in FIG. 2.

One specific design for an adaptor 54 according to the invention for use in the light-communication system 30 as shown in FIG. 1 is shown in FIGS. 2–6. The adaptor 54 has a frame 56 with a first housing 58 and a second housing 60. The first housing 58 has a seat 62 defined therein for receiving the first light-communication device 32 in a predetermined orientation. The second housing 60 has a surface 64 which defines a base for supporting the adaptor 54 on a surface, such as a countertop or desk. The first housing 58 and the second housing 60 are attached at an interface 66 defined by a first interface surface 68 of the first housing 58 and a second interface surface 70 of the second housing 60 (FIG. 4). An attachment mechanism 72 is associated therewith to attach the first housing 58 to the second housing 60, and to allow the first housing 58 to be guidingly supported on the second housing 60 for movement relative thereto.

The attachment mechanism 72 is shown in greater detail in FIG. 4. Specifically, the second housing 60 has a wall 74 from which an annular, rim-like projection 76 extends. The first housing 58 has a wall 78 with a complementary groove 80 therein. To assemble the frame 56, the end 82 of the second housing 60 is disposed within the space 84 defined by an inner surface 86 of the first housing wall 78. The projection 76 of the wall 74 may be elastically deformable so as to allow the end 82 of the second housing 60 to be advanced into the space 84 and finally disposed therein with the rim-like projection 76 disposed within the groove 80 of the first housing 58. The projection 76 and the groove 80, once assembled, serve to attach the first housing 58 to the second housing 60 and to allow the first housing 58 to move relative to the second housing 60 about an axis 88.

Referring to FIG. 3, it can be seen that a light guide 90 is provided having a first light port assembly 92, a second light port assembly 94 and a light transmission element 96 connecting the first light port assembly 92 to the second light port assembly 94. The light transmission element 96 is itself made up of two segments 98, 100. A first end 102 of the light transmission element segment 98 is coupled to the first light port assembly 92. A second end 104 of the light transmission element segment 98 has a distalmost region which defines a first interface surface 106 at the interface 66 between the first housing 58 and the second housing 60. Similarly, the second light transmission element segment 100 has a first end 108 and a second end 110, the first end 108 coupled to the second light port assembly 94 and a second end 110 defining a second interface surface 112 at the interface 66.

Figures 5, 6:
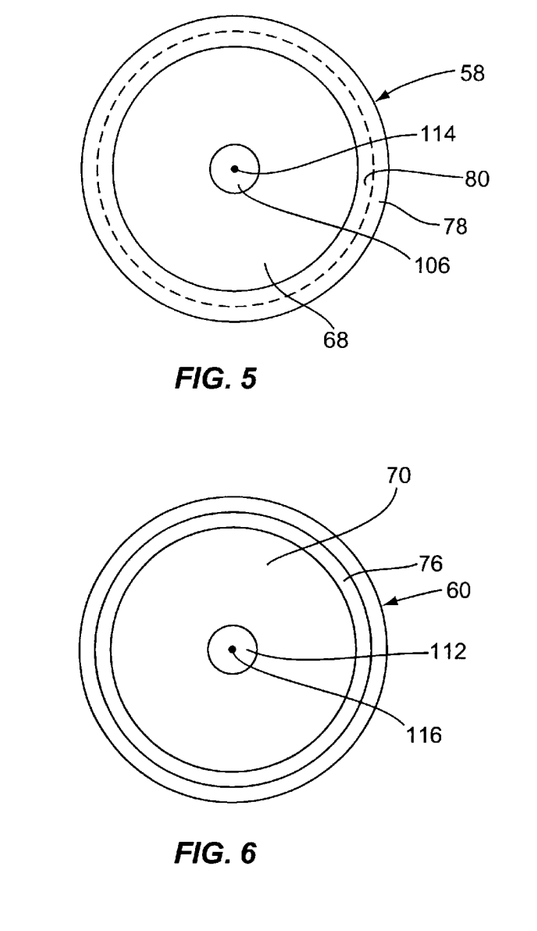
FIG. 5 is a bottom view of the first housing of the adaptor shown in FIG. 2.
FIG. 6 is a top view of the second housing of the adaptor shown in FIG. 2.

The first and second interface surfaces 106, 112 are circular as shown in FIGS. 5 and 6, although obviously the surfaces 106, 112 could be other than circular (i.e., rectangular, etc.). As shown, the centers 114, 116 of the first and second interface surfaces 106, 112 are aligned with the axis 88 about which the first housing 58 is movable relative to the second housing 60, although the surfaces may only be aligned when the first and second housings 58, 60 are at predetermined angular positions relative to each other.

As shown in FIG. 3, the first and second interface surfaces 106, 112 are flat and either abut each other or have only a minor air gap therebetween. Because the surfaces 106, 112 are perpendicular to the path of the light signals which pass therethrough at the interface, a more substantial air gap could exist. However, given that misalignment of the surface 106 relative to the interface surface 112 could cause some of the light signals passed therebetween to be reflected, and thereby lost, an abutting relation or a small air gap is desired to minimize the chances of misalignment.

In operation, a light signal (in the form of a light ray) may be transmitted from the light port assembly 36 of the light-communication device 32 along the first axis of propagation 38. With the device 32 disposed in the seat 62 provided in the first housing 58, the light port assembly 36 is aligned with the first light port assembly 92 of the adaptor 54 such that the light signal from the light-communication device 32 is received by the light port assembly 92.

The light port assembly 92 as shown in FIG. 3 is an optical device in the form of a single lens with a flat surface, the surface being perpendicular to the path of propagation of the light signal, represented by the arrow 38. As mentioned previously in regard to the interface surfaces 106, 112 of the first and second light transmission element segments 98, 100, the perpendicular nature of the lens surface relative to the path of propagation of the light signal permits a significant portion of the light signal to be passed through the light port assembly 92 and into the first light transmission element segment 98. Here also, while the light-communication device 32 could be disposed in the seat 62 with its light port assembly 36 abutting the first light port assembly 92, it is believed an air gap may be maintained without significant dissipation of the light signal and loss of the information transmitted therewith.

To allow substantially all of the light signal to be passed between the light ports 92, 94, the light transmission element segments 98, 100 have external surfaces 118, 120 polished to maximize the internal reflection. Additionally, the external surfaces 118, 120 of the light segments 98, 100 may be painted with a reflective coating to promote internal reflection of the light signal within the light transmission segments 98, 100.

Having traveled from the first light port assembly 92 through the light transmission element segments 98, 100, the light signal is outputted from the second light port assembly 94 in the direction of the second axis of propagation 42. As shown in FIG. 3, the second light port assembly 94 includes an optical device in the form of a flat lens, with its surface shown perpendicular to the light signal exiting from the adaptor 54 through the second light port assembly 94.

Accordingly, through the use of the adaptor 54, the direction and axis of propagation of the light signal/rays transmitted from the light-communication device 32 are altered. In fact, the direction of the light signal/rays exiting the adaptor 54 may be changed so as to be directed along an axis at any angle relative to its original orientation leaving the first light-communication device 32. As such, the user may be freed from the concern of how the first light-communication device 32 is oriented relative to the second light-communication device 34.

Figure 7:
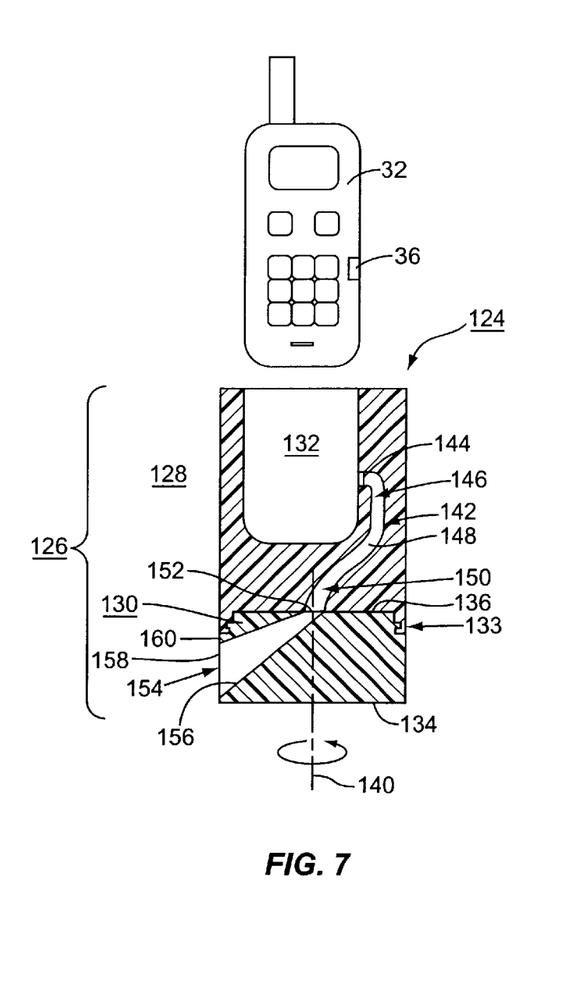
FIG. 7 is a cross-sectional view of a further embodiment of an adaptor according to the present invention similar to the adaptor shown in FIG. 2, but with a second light port assembly including a conically-shaped mirror instead of a flat lens.

Another adaptor 124 according to the invention is shown in FIG. 7 which is a modification of the adaptor 54 shown in FIGS. 2–6. Similar to the adaptor 54, the adaptor 124 has a frame 126 which includes a first housing 128 and a second housing 130. The first housing 128 has a seat 132 for the light-communication device 32 defined therein, and the second housing 130 has a surface 134 which defines a base surface on which the adaptor 124 can be seated. The first housing 128 and the second housing 130 are attached at an interface 136 through an attachment mechanism 138 similar to the attachment mechanism 72 used to connect the first and second housings 58, 60 of the adaptor 54.

A light guide 142 includes a first light port assembly 144 in the first housing 128 and a light transmission element 148 coupled at a first end 146 of the light transmission element 148 to the first light port assembly 144. The second end 150 of the light transmission element 148 defines an interface surface 152 at the interface 136 between the first and second housings 128, 130. The interface surface 152 allows a light signal received from the first light port assembly 144 to be directed along a predetermined path to a second light port assembly 154.

The second light port assembly 154 differs from the second light port assembly 94 on the previously described adapter 44 in that it includes an optical device in the form of an conical mirror 156 and an opening 158 formed in a wall 160 of the second housing 130. Light passing from the first interface surface 152 onto the mirror 156 is directed through the opening 158 in the wall 160, thereby creating a light signal beam which can be used to pass light signals with the second light-communication device 34 along the second axis 42. It will thus be recognized that a mirror, such as the mirror 156, can be used to replace one or both of the lens used in the first and second light port assemblies 92, 94 shown in FIG. 3, although a lens (not shown) may also be disposed in the opening 158.

Figure 8:
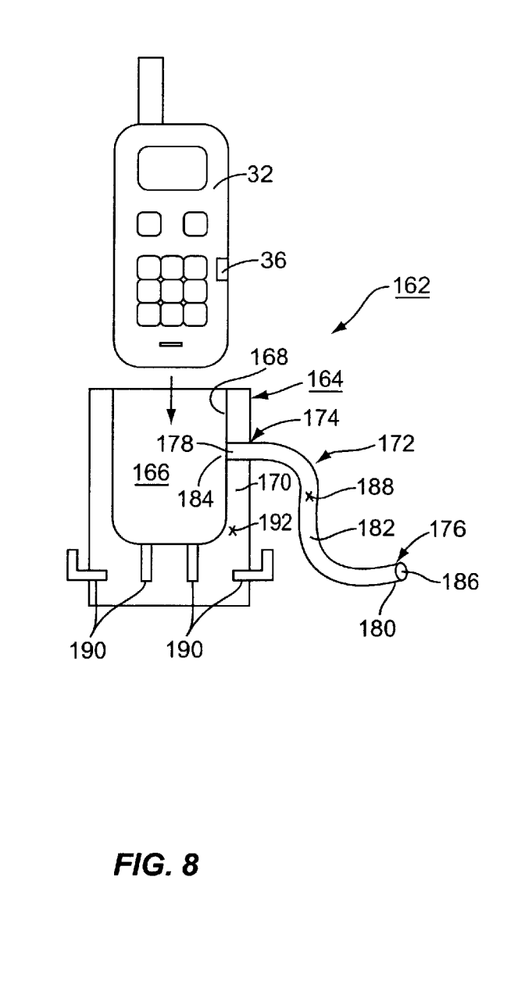
FIG. 8 is a cross-sectional view of another embodiment of an adaptor according to the present invention incorporating a length of fiber optic cable.

A further alternative adaptor 162 according to the invention is shown in FIG. 8. The adaptor 162 has a frame 164 with a seat 166 for the light communication device 32 defined therein by a surface 168 of a wall 170. A light guide 172 has a first end 174 attached to the wall 170 of the frame 164. A second end 176 of the light guide 172 is free to move relative to the first end 174 which is fixedly attached to the frame. 164. The light guide 172 includes a first light port assembly 178, a second light port assembly 180, and a light transmission element 182 for directing a light signal in a reconfigurable path therebetween.

The light guide 172 of the adaptor 162 may be made from a piece of fiber optic cable, with its ends cut and polished to provide flat surfaces 184, 186. A reflective coating applied to the external surface 188 of the light transmission element 182 serves to maintain the light signal within the light transmission element 182 until it exits the second light port assembly 180.

It will also be noted that the frame 164 has a number of clips 190 attached to an external surface 192 thereof. The clips 190 are used to cradle the light guide 172 so as to position the second end 176 of the light guide 172 so that the second light port assembly 180 is aligned with the light port assembly 40 of the second light-communication device 34, for example, to output a light signal thereto along a second axis of propagation 42. Alternatively, the light guide 172 could be fitted with a flexible gooseneck collar, so that the light transmission element 182 can be flexibly positioned relative to the frame 164 to take on a greater number of angles than is possible using the clips 190 alone.

Figure 9:
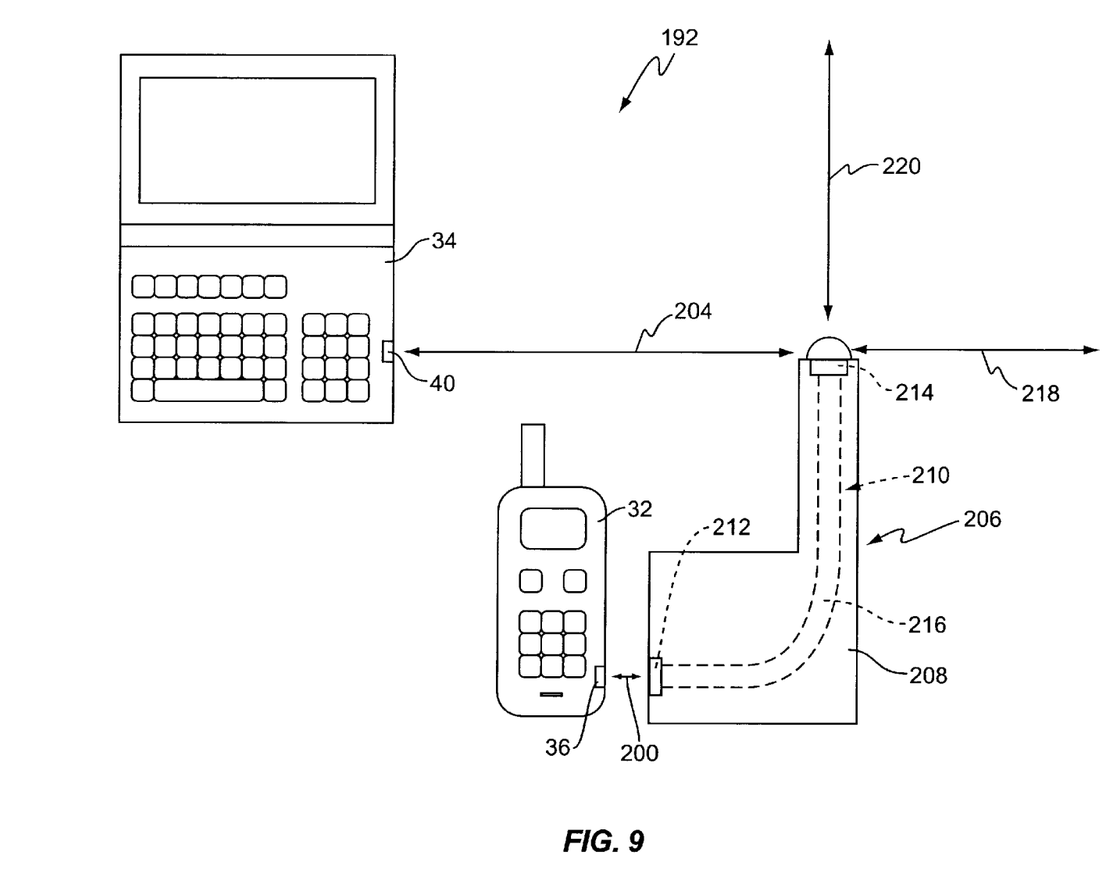
FIG. 9 is schematic diagram of a system including first and second light-communication devices and an adaptor according to the invention to couple the first and second light-communication devices in a multidirectional fashion.

A further system 192 including a first light-communication device 32 and a second light-communication device 34 is shown in FIG. 9. The first light-communication device 32 has a light port assembly 36 for receiving and transmitting light signals along a first axis of propagation 200. The second light-communication device 34 has a light port assembly 40 for receiving and transmitting light signals along a second axis of propagation 204. As shown, the axis 200 is not collinear with the axis 204, and the light rays transmitted by the device 32 travel away from the device 34, and the light rays from the device 34 directed toward its light port assembly with the devices 32, 34 oriented as in FIG. 9 are obstructed by the device 32.

An adaptor 206 according to the invention is provided having a frame 208 and a light guide 210 supported on the frame 208. The light guide 210 has a first light port assembly 212 and a second light port assembly 214, with a light transmission element 216 connecting the first light port assembly 212 to the second light port assembly 214 to direct light signals therebetween along a predetermined path. While the first light port assembly 212 is unidirectional, receiving light signals from and outputting light signals to the light-communication device 32 along the first axis of propagation 200, the second light port assembly 214 is a multidirectional light port capable of passing the light signals from the first light port assembly 212 along the axis 204 and a number of additional axes, 218 and 220, for example. One of the axes, shown as 218, is parallel to the first axis of propagation 200 and a light ray passing along the axis 218 would be traveling in generally the same direction as that along which it was initially transmitted from the light port assembly 36. The second axis 220 is transverse to both the axes 204, 218.

The adaptor 206 has several advantages over the adaptors 54, 124, 162 shown above for use with the system 30. By providing a multidirectional light port assembly 214, the need for the attachment mechanisms 72, 138 for the frame sections or housings 58, 60, 128, 130 is eliminated, thereby simplifying the adaptor 206 both from a manufacturing standpoint and from an operational standpoint. Additionally, the concern over misalignment of the interface surfaces 106, 112, 152 of the light transmission elements 96, 148 of the light guides 90, 142 are eliminated. Further, the operator does not need to concern himself or herself with ensuring that the second light port assemblies 94, 154, 180 of the adaptors 54, 124, 162 are operationally aligned with the remotely-located second light-communication device 34.

Figure 10:
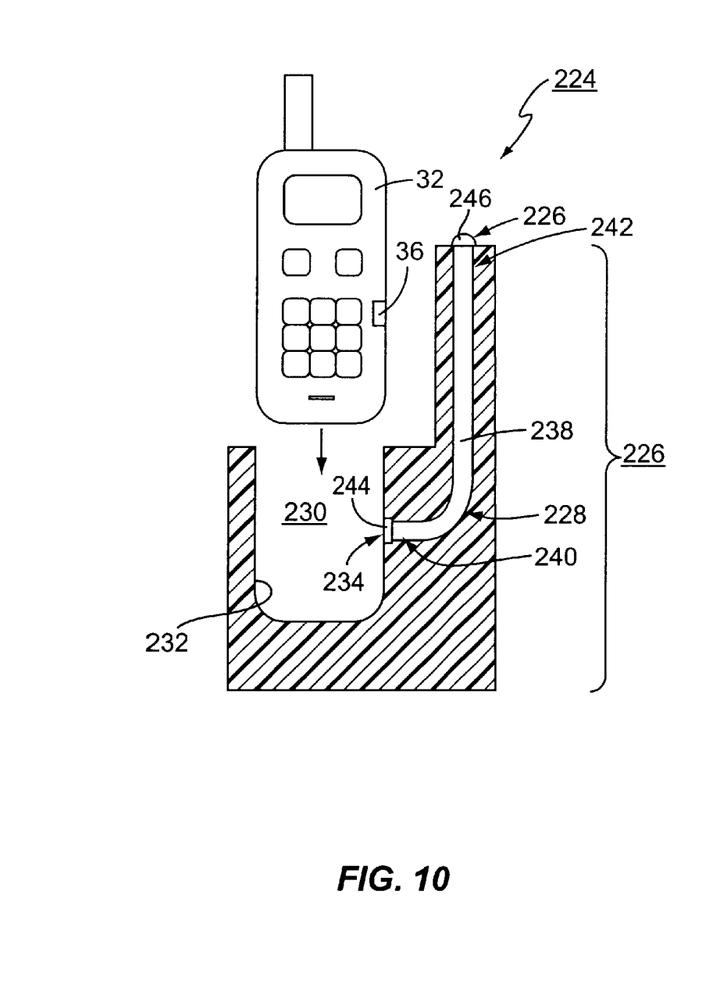
FIG. 10 is a cross-sectional view of a still further embodiment of an adaptor according to the present invention including a multidirectional, hemispherical lens.

An adaptor 224 according to the invention is shown in FIG. 10 for use with the system 192. The adaptor 224 has a frame 226 which houses a light guide 228. The frame 226 also has a seat 230 for the light-communication device 32 defined by a surface 232 of the frame 226. The light guide 228 has a first light port assembly 234, a second light port assembly 236, and a light transmission element 238 coupling the first light port assembly 234 through a first end 240 thereof with the second light port assembly 236 through a second end 242 thereof. The light transmission element 238 directs light entering the first light port assembly 234 along a predetermined path to the second light port assembly 236 from which it is outputted to the second light-communication device 34.

The first light port assembly 234 includes a flat lens 244, which allows light to be received from and outputted to the light-communication device 32 along the first axis 200. The second light port assembly 236 includes a hemispherical lens 246. The hemispherical lens 246 allows light signals to be outputted along any of the axes 204, 218, 220 and to be received along any of the axes 204, 218, 220. While only three axes have been shown in FIG. 9, it should be understood that the adaptor 224 passes light signals through the hemispherical lens 246 along a plurality of axes, of which only three have been shown for illustrative purposes.

Consequently, in operation, there is no need to selectively position a moving part, as in the adaptors 54, 124, 162, to ensure that the axis along which the light signals travel from the adaptor 224 is aligned with the axis of propagation of light signals from and to the second light-communication device 34. Instead, the hemispherical lens 246 provides a broad range of axes for communication between the first and second light-communication devices 32, 34.

Figure 11:
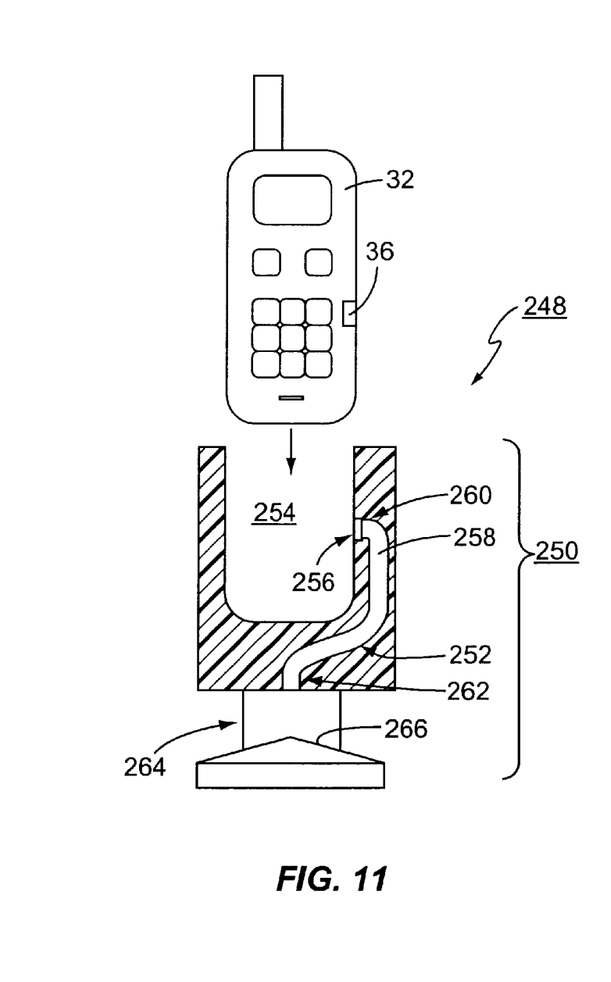
FIG. 11 is a cross-sectional view of yet another embodiment of an adaptor according to the present invention having a multidirectional, conical mirror.

A further adaptor 248 according to the invention is shown in FIG. 11. The adaptor 248 also has a frame 250 and a light guide 252. The frame 250 has a seat 254 for receiving the first light-communication device 32 therein with the light port assembly 36 of the first light-communication device 32 aligned with a first light port assembly 256 of the light guide 252 to allow light signals to be passed from the light port assembly 36 of the first light port assembly 256. The light guide 252 has a light transmission element 258 which is coupled at a first end 260 to the first light port assembly 256 and is coupled at a second end 262 to the second light port assembly 264. The second light port assembly 264 passes light signals to and receives light signals from the first light-communication device 32 along a broad plurality of axes.

As can be seen, a conical mirror 266 has been substituted for the hemispherical lens 246 of the adaptor 224. As was true of the case for the adaptors 54, 124, 162, mirrors, such as the conical mirror 266, can be substituted for lenses, such as the hemispherical lens 246.

Because the light signal transmitted from the light-communication device 32 is outputted over a broad plurality of axes of propagation through either the hemispherical lens 246 or the conical mirror 266, the power or strength of the signal thus transmitted may be significantly reduced. This may cause problems in reception, or require that the light-communication devices provide a high-power signal. The use of high-power signals is undesirable for the reasons mentioned above regarding battery consumption and power supply minimization/optimization.

Figure 12:
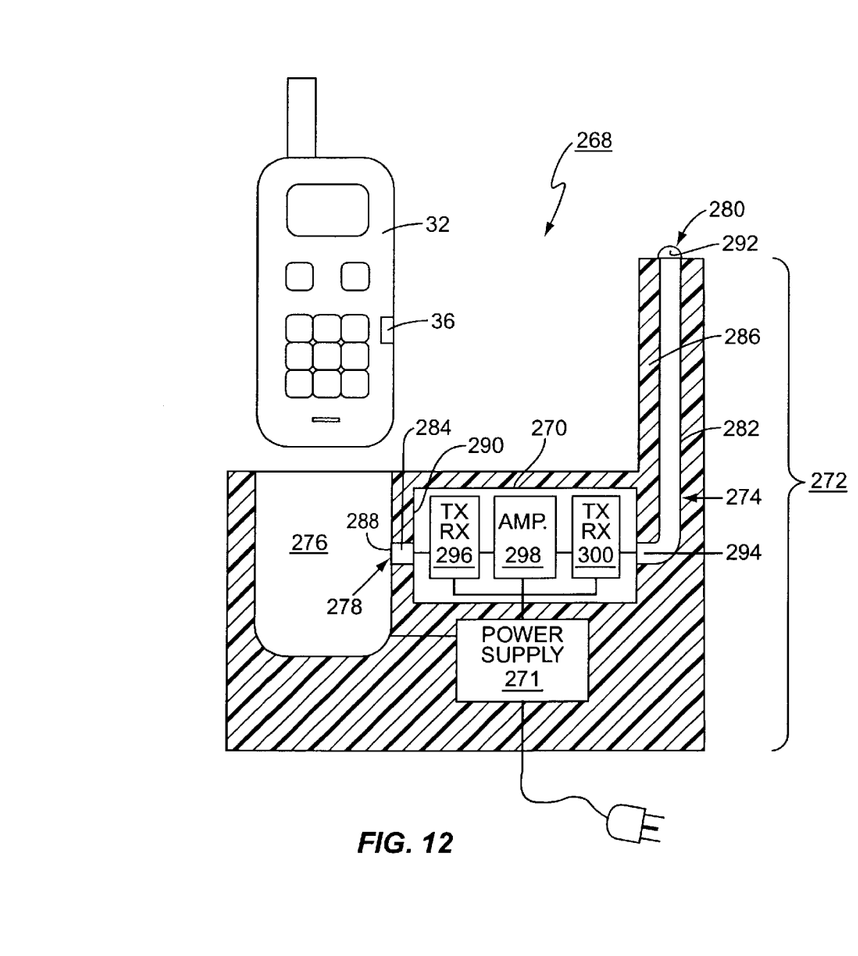
FIG. 12 is a cross-sectional view of a yet still further embodiment of an adaptor according to the present invention including an amplifier assembly and a multidirectional lens.

Consequently, an adaptor 268 is shown in FIG. 12 similar in structure to the adaptor 224, but also including an amplifier assembly 270 powered by a power supply 271. The adaptor 268, and in particular the amplifier assembly 270 and associated power supply 271, allows for the power or strength of the light signals transmitted from and directed to the light-communication device 32 to be increased without increasing the power consumption of the light-communication device 32. For example, the power supply 271 may be self-contained, or part of a battery charger (as shown) also used to recharge the battery of the associated first light-communication device 32.

In particular, the adaptor 268 has a frame 272 and a light guide 274 supported on the frame 272. The frame 272 also defines a seat 276 in which the first communication device 32 may be placed. The light guide 274 has a first light port assembly 278, a second light port assembly 280, and a light transmission element 282, which includes a first light transmission element segment 284 and a second light transmission element segment 286. The first light transmission element segment 284 is coupled at a first end 288 to the first light port assembly 278 and at a second end 290 to the amplifier assembly 270. Similarly, the second light transmission element segment 286 is coupled at a first end 292 to the second light port assembly 280, and at a second end 294 to the amplifier assembly 270.

In operation, a light signal is transmitted from the light port assembly 36 of the first light-communication device 32, for example, and is received by the first light port assembly 278 of the light guide 274. The light signal is directed along a predetermined path defined by the first light transmission element segment 284 to the amplifier assembly 270, wherein it is amplified for transmission.

Specifically, the amplifier assembly 270 includes a first transmitter/receiver assembly 296, an amplifier 298, and a second transmitter/receiver assembly 300. As a light signal is received by the receiver portion of the transmitter/receiver assembly 296 from the second end 290 of the first light transmission element segment 284, the light signal may be transformed into an electric signal which is amplified by the amplifier 298, which is an electric signal amplifier. The amplified electric signal is then passed from the amplifier 298 to the transmitter portion of the transmitter/receiver assembly 300 for transmission as a light signal to the second end 294 of the second light transmission element segment 286. The light signal is then directed along a predetermined path defined by the second light transmission element segment 286 to the second light port assembly 280 from where it is passed along a broad plurality of axes of propagation as shown.

Figure 13:
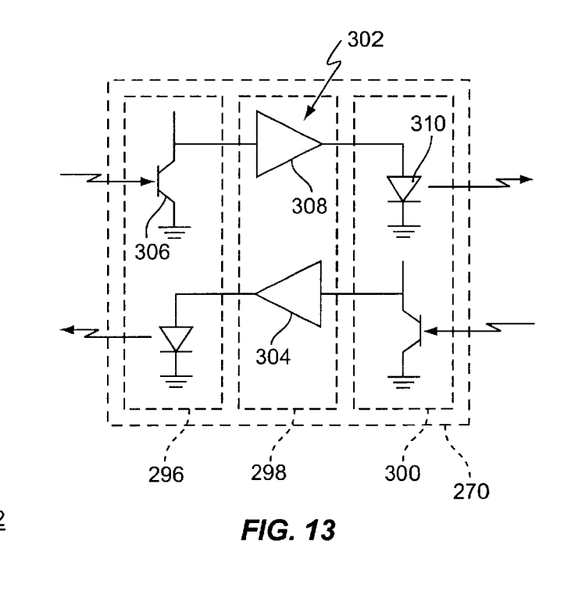
FIG. 13 is a schematic diagram of the amplifier assembly shown in FIG. 12.

The amplifier assembly 270 is explained in detail with reference to FIG. 13. While the amplifier assembly 270 may be shown as the transmitter/receiver assembly 296, the amplifier 298, and the transmitter/receiver assembly 300 in FIG. 12, the amplifier assembly 270 may also be represented as two electric circuits 302, 304 as shown in FIG. 13, one of which is responsible for the passage of light signals from the light-communication device 32 to the light-communication device 34 and the other circuit responsible for communication of light signals from the second light-communication device 34 to the first light-communication device 32. As shown, the circuit 302 is similar to the circuit 304. As a consequence, only the construction and operation of the circuit 302 will be described.

The circuit 302 has three elements: a transistor 306, an amplifier 308, and a diode 310. The transistor 306 has a light receiving surface at its base. The application of light energy to the base of the transistor 306 causes the transistor 306 to be activated producing a signal at a collector on the transistor 306. The signal at the collector of the transistor 306 is coupled to and amplified by the amplifier 308. The amplified electrical signal is passed to the diode 310, in particular a light emitting diode, which causes a light signal to be generated or emitted.

Figure 14:
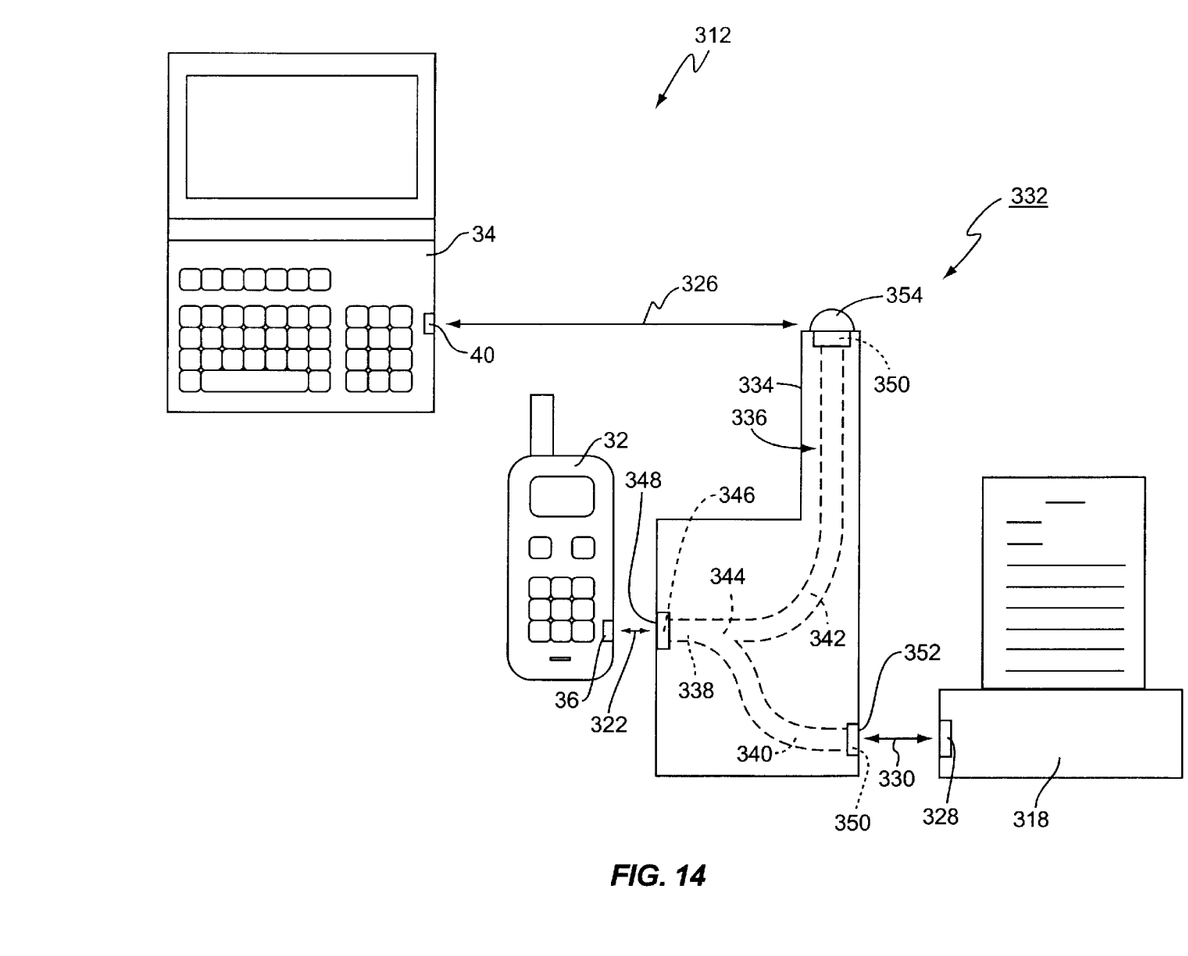
FIG. 14 is a schematic diagram of a system including first, second and third light-communication devices and an adaptor according to the invention to couple the first, second, and third light-communication devices selectively in a unidirectional and a multidirectional fashion.

A still further system 312 is shown in FIG. 14 including a first light-communication device (a phone) 32, a second light-communication (a laptop computer) 34, and a third light-communication device (a fax) 318. The first light-communication device 32 has a light port assembly 36 which allows light to be received and transmitted along a first propagational axis 322. The second light-communication 34 has a light port assembly 40 which allows light signals to be transmitted and received along an axis 326. The third light-communication device 318 has a light port assembly 328 which allows light to be transmitted and received along a propagation axis 330. It will be noted from FIG. 14, that none of the axes 322, 326, 330 is collinear with any of the other axes.

An adaptor 332 is provided for use in the system 312. The adaptor 322 has a frame 334 which supports a light guide 336. The light guide 336 has a first trunk light transmission element segment 338, first and second leg light transmission element segments 340, 342, and a Y-connector 344. The Y-connector 344 connects the trunk light transmission element segment 338 with the leg light transmission element segments 340, 342.

The light guide 336 also has a first light port assembly 346 which includes a flat lens 348, and a second light port assembly 350 which includes a first flat lens 352 and a second hemispherical lens 354. The trunk light transmission element segment 338 connects the first light port assembly 346 with the Y-connector 344. The first leg light transmission element segment 340 connects the Y-connector 344 with the first flat lens 352. The second leg light transmission element segment 342 connects the Y-connector 344 with the second hemispherical lens 354.

By providing the adaptor 332, the first light-communication device 32 can communicate both with the second light-communication device 34 and the third light-communication device 318. Because the communications along the axis of propagation 330 between the adaptor 332 and the third light-communication device 318 are focused, the light-communication device 318 may be placed further away from the first light-communication device 32 than the second communication device 34. However, by providing the hemispherical, multidirectional lens 354, communications can be carried out with other devices (such as the device 34) throughout the room without the need to reorient the lens 352 for each different light-communication device with which the first light-communication device 32 is intended communicate.

Figure 15:
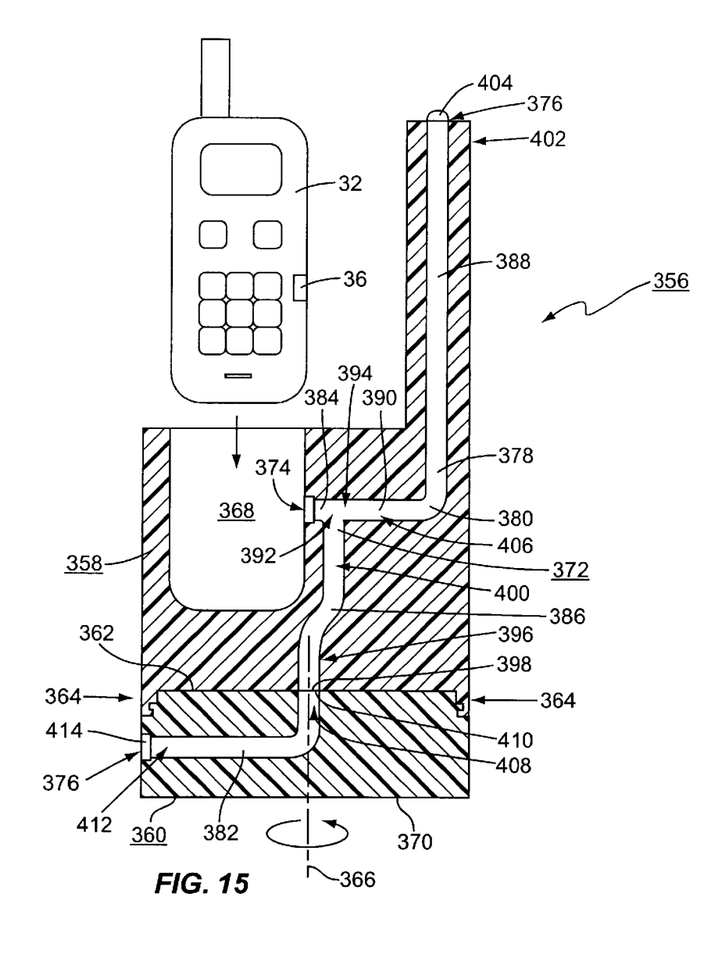
FIG. 15 is a cross-sectional view of another embodiment of an adaptor according to the present invention having a unidirectional first light port assembly and a multidirectional second light port assembly.

An adaptor 356 is shown in FIG. 15 for use in the system 312. The adaptor 356 has a first housing 358 and a second housing 360. The first housing 358 and the second housing 360 are attached at an interface 362 through the use of an attachment mechanism 364 such that the first housing 358 is supported on the second housing 360 and movable relative thereto about an axis 366. The first housing 358 has a seat 368 defined therein for receiving the first light-communication device 32, and the second housing 360 has a base surface 370 for supporting the adaptor 356 on a surface, for example, of a desk. The adaptor 356 also includes a light guide 372. The light guide 372 has a first light port assembly 374, a second light port assembly 376, and a light transmission element 378. The light transmission element 378 has a first section 380 and a second section 382. The first section 380 is housed in the first housing 358 and the second section 382 is housed in the second housing 360.

The first section 380 of the light transmission element 378 has a trunk light transmission element segment 384, a first leg light transmission element segment 386 and a second leg light transmission element segment 388. The trunk segment 384, the first leg segment 386, and the second leg segment 388 are connected through the use of a Y-connector 390. Specifically, the trunk segment 384 has a first end 392 which is attached to the first light port assembly 374 and a second end 394 which is attached to the Y-connector 390. The first leg segment 386 has a first end 396 which defines a first interface surface 398 at the interface. 362 between the first housing 358 and the second housing 360, and a second end 400 which is coupled to the Y-connector 390. The second leg segment 388 has a first end 402 which is coupled to a hemispherical lens 404 which is a part of the second light port assembly 376, and a second end 406 which is coupled to the Y-connector 390.

The second section 382 has a first end 408 which defines a second interface surface 410, which interfaces with the first interface surface 398, and a second end 412 which is coupled to a flat lens 414 which is part of the second light port assembly 376.

In operation, light signals can be transmitted to and from the first light-communication device 32 disposed in the seat 368 with either of the lenses 404, 414 of the second light port assembly 376. The hemispherical lens 404 of the second light port assembly 376 allows for a range of axes of propagation to be covered, while the flat lens 414 allows for a narrow focused light signal to be transmitted to one or the other light-communication devices 32, 34.

As one of ordinary skill in the art would recognize, because the light signal transmitted by the first light-communication device 32 is being split by the aforementioned adaptor 356 into two beams, the strength of the resultant light signals is less that the strength of the incident light signal. Consequently, an amplifier, similar to the amplifier 270 described above relative to the adaptor 268, may be combined with the adaptor 356 to increase signal strength before the resultant light signals are outputted from the adaptor 356.

Figure 16:
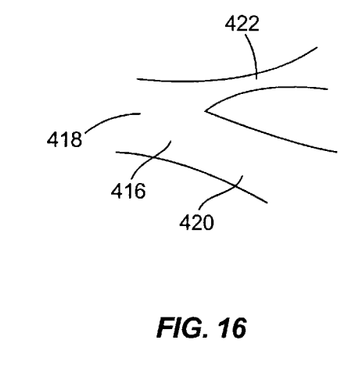
FIG. 16 is a diagram of a Y-connector for use in the adaptor of FIG. 15.

While the adaptor 356 shown in FIG. 15 has first and second leg segments 386, 388 with relatively similar cross-sectional areas, this need not be the case. For example, as shown in FIG. 16, a Y-connector 416 is coupled to a trunk segment 418, a first leg segment 420, and a second leg segment 422. As shown, because the cross-sectional area of the first leg segment 420 is greater than the cross-sectional area of the second leg segment 422 adjacent to the Y-connector 416, more light passes from the trunk segment 418 into the first leg segment 420. Hence, more of the transmitted signal which is passed to the trunk 418 will go along the first leg segment 420.

Still other aspects, objects, and advantages of the present invention can be obtained from a study of the specification, the drawings, and the appended claims.

We claim:

1. An adaptor for use with a light-communication device, the adaptor comprising:
   a frame, the frame comprising
      a first housing, the first housing comprises a first housing interface surface, and
      a second housing guidingly supported on the first housing to be moveable relative to the first housing, the second housing comprising a seat for receiving a light-communication device therein, the second housing comprises a second housing interface surface proximate to the first housing interface surface;
   a light guide on the frame, the light guide comprising
      a first light port assembly to receive a light from a light-communication device, said first light port assembly housed in the second housing, said first light port assembly proximate to the seat,
      a second light port assembly to output a light signal received by the first light port assembly, said second light port assembly housed in the first housing, and
      a light transmission element for directing a light signal in a predetermined path between the first and second light port assemblies, wherein the light transmission element comprises a light transmission element with a selectively adjustable path between the first and second light port assemblies, the light transmission element comprises a first light transmission element segment housed in the first housing coupled to the first light port assembly and having a first light transmission element interface disposed at the first housing interface surface and a second light transmission element segment housed in the second housing coupled to the second light port assembly and having a second light transmission element interface surface disposed at the second housing interface surface parallel to and proximate to the first light transmission element interface surface.

2. The adaptor according to claim 1, wherein the first and second housings are moveable relative to each other about a housing axis, and the first and second light transmission element interface surfaces each are substantially circular, have a center axis, and have the center axis collinear with the housing axis.

3. The adaptor according to claim 2, wherein the first port assembly comprises a flat lens.

4. The adaptor according to claim 2, wherein the second port assembly comprises a flat lens.

5. The adaptor according to claim 2, wherein the second port assembly comprises a mirror.

6. A light communication system comprising:
   first and second light communication devices; and
   an adaptor with a frame and a light guide on the frame,
   the light guide comprising a first light port assembly to receive a light signal from one of the first and second light-communication devices, a second light port assembly to output a light signal received by the first light port assembly to the other of the first and second light-communication devices, and a light transmission element for directing a light signal in a predetermined path between the first and second light port assemblies,
   wherein the light transmission element comprises a light transmission element with a selectively adjustable path between the first and second light port assemblies, and
   the frame comprises a first housing and a second housing guidingly supported on the first housing to be moveable relative to the first housing,
   the first housing comprises a first housing interface surface and the second housing comprises a second housing interface surface proximate to the first housing interface surface; and
   the light transmission element comprises a first light transmission element segment housed in the first housing, coupled to the first light port assembly and having a first light transmission element interface surface disposed at the first housing interface surface and a second light transmission element segment housed in the second housing, coupled to the second light port assembly and having a second light transmission element interface surface disposed at the second housing interface surface parallel to and proximate to the first light transmission element interface surface.

7. An adaptor for allowing a first light-communication device communicating on light rays along a first axis of propagation to communicate with a remotely positioned second light-communication device communicating on light rays along a second, non-collinear axis of propagation without the need for a cable therebetween, said adaptor comprising:
   a body;
   a first light port positioned on said body and alignable with said first axis of propagation to wirelessly communicate with said first light communication device;
   a second light port positioned on said body and alignable with said second axis of propagation to wirelessly communicate with said second light communication device;
   means for conveying light between said first light port and said second light port; and
   wherein said conveying means comprises a u-shaped light transmission element positioned within the body.

8. The adaptor of claim 7 wherein said first and second light ports are positioned on a first side of said adaptor.

9. An adaptor for allowing a first light-communication device communicating on light rays along a first axis of propagation to communicate with a remotely positioned second light-communication device communicating on light rays along a second, non-collinear axis of propagation without the need for a cable therebetween, said adaptor comprising:
   a body;
   a first light port positioned on said body and alignable with said first axis of propagation to wirelessly communicate with said first light communication device;
   a second light port positioned on said body and alignable with said second axis of propagation to wirelessly communicate with said second light communication device;
   means for conveying light between said first light port and said second light port; and
   wherein said body comprises a first portion and a second portion, said second portion rotatably mounted on said first portion.

10. The adaptor of claim 9 wherein said conveying means is positioned within the body and traverses between said first and second portion.

11. An adaptor for allowing a first light-communication device communicating on light rays along a first axis of propagation to communicate with a remotely positioned second light-communication device communicating on light rays along a second, non-collinear axis of propagation without the need for a cable therebetween, said adaptor comprising:
   a body;
   a first light port positioned on said body and alignable with said first axis of propagation to wirelessly communicate with said first light communication device;
   a second light port positioned on said body and alignable with said second axis of propagation to wirelessly communicate with said second light communication device;
   means for conveying light between said first light port and said second light port; and
   wherein said body comprises a seat adapted to have one of said first or second light-communicating devices positioned therewithin.

12. The adaptor of claim 11 wherein said first light port is positioned proximate said seat.

13. An adaptor for allowing a first light-communication device communicating on light rays along a first axis of propagation to communicate with a remotely positioned second light-communication device communicating on light rays along a second, non-collinear axis of propagation without the need for a cable therebetween, said adaptor comprising:
   a body;
   a first light port positioned on said body and alignable with said first axis of propagation to wirelessly communicate with said first light communication device;
   a second light port positioned on said body and alignable with said second axis of propagation to wirelessly communicate with said second light communication device;
   means for conveying light between said first light port and said second light port; and
   wherein said conveying means comprises an optical fiber that extends from said body and is selectively positionable by a user, said optical fiber not extending to at least one of said first and second light-communicating devices.

14. An adaptor for allowing a first light-communication device communicating on light rays along a first axis of propagation to communicate with a remotely positioned second light-communication device communicating on light rays along a second, non-collinear axis of propagation without the need for a cable therebetween, said adaptor comprising:
   a body;
   a first light port positioned on said body and alignable with said first axis of propagation to wirelessly communicate with said first light communication device;
   a second light port positioned on said body and alignable with said second axis of propagation to wirelessly communicate with said second light communication device;
   means for conveying light between said first light port and said second light port; and
   wherein said conveying means comprises a split path.

15. The adaptor of claim 14 wherein said split path allows communication between the first and second light-communicating devices as well as a third light-communicating device.

16. The adaptor of claim 14 wherein said split path is positioned within said body.

17. An adaptor to relay a light signal between a light-communication device and a second light-communication device, the adaptor comprising:
   a frame positioned between said first and second light-communication devices;
   a first light port disposed in said frame to align with a light port on the first light-communication device and to wirelessly receive a light signal from said first light-communication device;
   a second light port disposed in said frame to wirelessly transmit said light signal to the second light-communication device;
   a light transmission element for directing said light signal along a predetermined optical path between said first light port and said second light port; and
   wherein said frame comprises a seat adapted to receive said first light-communication device.

18. The adaptor of claim 17 wherein said first light port is contiguous said seat.

19. An adaptor to relay a light signal between a light-communication device and a second light-communication device, the adaptor comprising:
   a frame positioned between said first and second light-communication devices;
   a first light port disposed in said frame to align with a light port on the first light-communication device and to wirelessly receive a light signal from said first light-communication device;
   a second light port disposed in said frame to wirelessly transmit said light signal to the second light-communication device;
   a light transmission element for directing said light signal along a predetermined optical path between said first light port and said second light port; and
   wherein said frame comprises a first housing containing said first light port and a second housing moveable relative to said first housing and containing said second light port.

* * * * *